US 7,565,443 B2
Jul. 21, 2009

(12) United States Patent
Rossmanith et al.

(54) COMMON PERSISTENCE LAYER

(75) Inventors: Stefan Rossmanith, Walldorf (DE);
Stefan Baeuerle, Malsch (DE);
Hans-Dieter Geyer, Wieslock (DE);
Peter Surma, Heidelberg (DE);
Christian Lienert, Griesheim (DE)

(73) Assignee: SAP AG, Walldorf (DE)

( * ) Notice: Subject to any disclaimer, the term of this patent is extended or adjusted under 35 U.S.C. 154(b) by 993 days.

(21) Appl. No.: 10/665,989

(22) Filed: Sep. 19, 2003

(65) Prior Publication Data

US 2004/0117435 A1    Jun. 17, 2004

Related U.S. Application Data

(60) Provisional application No. 60/433,327, filed on Dec. 13, 2002.

(51) Int. Cl.
  *G06F 15/173* (2006.01)
  *G06F 15/16* (2006.01)
(52) U.S. Cl. .................. 709/238; 709/230; 709/246; 709/202; 709/203
(58) Field of Classification Search .......... 709/230, 709/238, 246, 201–203
See application file for complete search history.

(56) References Cited

U.S. PATENT DOCUMENTS

| 6,085,030 | A | * | 7/2000 | Whitehead et al. ........... 709/203 |
| 6,917,937 | B1 | * | 7/2005 | Rubendall ........................ 707/5 |
| 7,117,267 | B2 | * | 10/2006 | Bavadekar .................. 709/230 |
| 2002/0010741 | A1 | * | 1/2002 | Stewart et al. .............. 709/204 |
| 2002/0013759 | A1 | * | 1/2002 | Stewart et al. ................ 705/37 |
| 2002/0019797 | A1 | * | 2/2002 | Stewart et al. ................ 705/37 |
| 2002/0083095 | A1 | * | 6/2002 | Wu et al. .................... 707/513 |
| 2002/0107913 | A1 | * | 8/2002 | Rivera et al. ................ 709/203 |
| 2002/0156693 | A1 | * | 10/2002 | Stewart et al. ................ 705/26 |
| 2002/0161688 | A1 | * | 10/2002 | Stewart et al. ................ 705/37 |
| 2002/0169842 | A1 | * | 11/2002 | Christensen et al. ........ 709/206 |
| 2002/0174225 | A1 | * | 11/2002 | Smith et al. ................. 709/226 |
| 2002/0198800 | A1 | * | 12/2002 | Shamrakov .................. 705/35 |
| 2003/0018808 | A1 | * | 1/2003 | Brouk et al. ................. 709/238 |
| 2003/0023675 | A1 | * | 1/2003 | Ouchi et al. ................. 709/203 |
| 2003/0037181 | A1 | * | 2/2003 | Freed .......................... 709/328 |
| 2003/0050969 | A1 | * | 3/2003 | Sant et al. .................... 709/203 |
| 2003/0055668 | A1 | * | 3/2003 | Saran et al. ..................... 705/1 |
| 2003/0074401 | A1 | * | 4/2003 | Connell et al. .............. 709/203 |
| 2003/0101283 | A1 | * | 5/2003 | Lewis et al. ................. 709/246 |
| 2003/0105800 | A1 | * | 6/2003 | Cullen ......................... 709/201 |
| 2003/0105887 | A1 | * | 6/2003 | Cox et al. .................... 709/328 |
| 2003/0120593 | A1 | * | 6/2003 | Bansal et al. ................. 705/39 |
| 2003/0145047 | A1 | * | 7/2003 | Upton ......................... 709/203 |
| 2006/0059107 | A1 | * | 3/2006 | Elmore et al. ................. 705/64 |

* cited by examiner

*Primary Examiner*—Kenny S Lin
*Assistant Examiner*—Hieu T Hoang
(74) *Attorney, Agent, or Firm*—Mintz, Levin, Cohn, Ferris, Glovsky & Popeo, P.C.

(57) ABSTRACT

A persistence layer for a message exchange system of an application integration system is disclosed. The message exchange system includes a message transport layer configured to transport messages from at least one sending application to one or more receiving applications, and a business process layer configured to execute business process logic on select ones of the messages processed by the message transport layer. The persistence layer is accessible by both the message transport layer and the business process layer, and is configured to store a reference associated with each messages processed by the message transport layer. A system further includes a database accessible from the persistence layer for storing a copy of each messages corresponding to the message references stored in the persistence layer.

13 Claims, 6 Drawing Sheets

COMMON PERSISTENCE LAYER

CROSS REFERENCE TO RELATED APPLICATIONS

This application claims priority to U.S. Provisional Patent Application No. 60/433,327, filed on Dec. 13, 2002.

BACKGROUND

The following description relates to business systems, for example, an exchange infrastructure for collaborative business systems.

Software components that perform a certain function are known as applications. Applications are widely used in a variety of business processes, each being an execution of one or more Web services according to a description of an active business process. Business process applications are increasingly used in collaborative situations, i.e. situations in which one or more applications receive data from another application.

A collaborative application environment typically relies on a precise messaging and transport layer for proper routing, addressing and transport of messages from one application to another. Collaborative business processes, however, require a more sophisticated infrastructure that can execute real-time business logic.

For instance, in a messaging and transport layer, a message exchange system may transport messages as a payload in an envelope such as an extensible markup language (XML) file. The system may look into the envelope, analyze where the message is from, and determine an intended recipient. The messaging and transport layer typically utilizes a database in which to store messages for persistence, at least until processing is complete. In a business processing layer, data is also assed between applications during execution of a business process. The business processing layer may also require some type of persistence mechanism, however usually only a status of the process is stored and not the data itself.

In an integrated environment, in which business processes are executed on top of messaging and transport services, having two layers of persistency, each directly connected to their respective processing layers, can limit performance and makes monitoring message exchanges more difficult. Further, logically separate persistence layers can make collaboration more difficult where the state of each message is kept differently for each layer.

SUMMARY

A persistence layer for a message exchange system of an application integration system is disclosed. The message exchange system includes a message transport layer configured to transport messages from at least one sending application to one or more receiving applications, and a business process layer configured to execute business process logic on select ones of the messages processed by the message transport layer. The persistence layer is accessible by both the message transport layer and the business process layer, and is configured to store a reference associated with each messages processed by the message transport layer. A system further includes a database accessible from the persistence layer for storing a copy of each messages corresponding to the message references stored in the persistence layer.

In another embodiment, a method for integrated message exchange in a collaborative business application landscape includes receiving a message from a sending application, storing a copy of the message in a database, and storing a reference to the message in a persistence layer. One method further includes executing at least one business process on the message, and based on the message reference stored in the persistence layer, transporting the message to at least one receiving application. Accordingly, a persistence layer is accessible from both a message transport layer and a business process layer, and is configured to store a reference to each messages processed by the message transport layer for use by the business process layer.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various figures indicate like elements.

DETAILED DESCRIPTION

The systems and techniques described here relate to enterprise application integration. Specific embodiments include systems and method employing a common persistence layer for executing message transport and business process logic services for messages communicated between applications through an enterprise application integration system.

Figure 1:
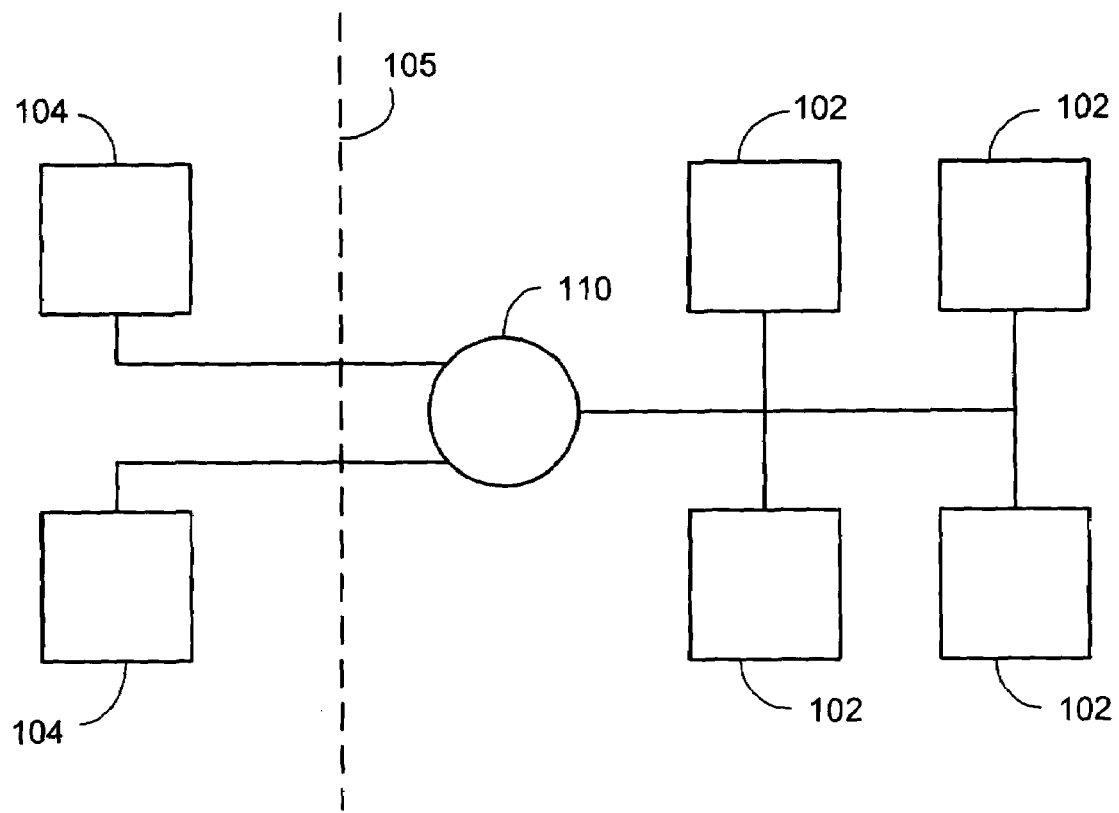
FIG. 1 is a simplified block diagram of an exchange system for integrated, message-based collaboration.

FIG. 1 is a simplified block diagram of one such application integration system 100 for integration and "loose coupling" (i.e. message-based interaction) of applications. The system 100 includes an exchange infrastructure (XI) 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates via messaging with one or more other components according to at least one of a number of communication protocols or standards.

The XI 110 is a self-contained, modularized exchange platform for driving collaboration among the components 102, 104. The XI 110 includes a central integration repository and directory storing shared collaboration knowledge. The XI 110 supports open standards such as various standard markup languages like the extensible markup language (XML), web service description language (WSDL), and simple object access protocol (SOAP) to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered, and accessed within a network of components 102, 104 using open standards.

Figure 2:
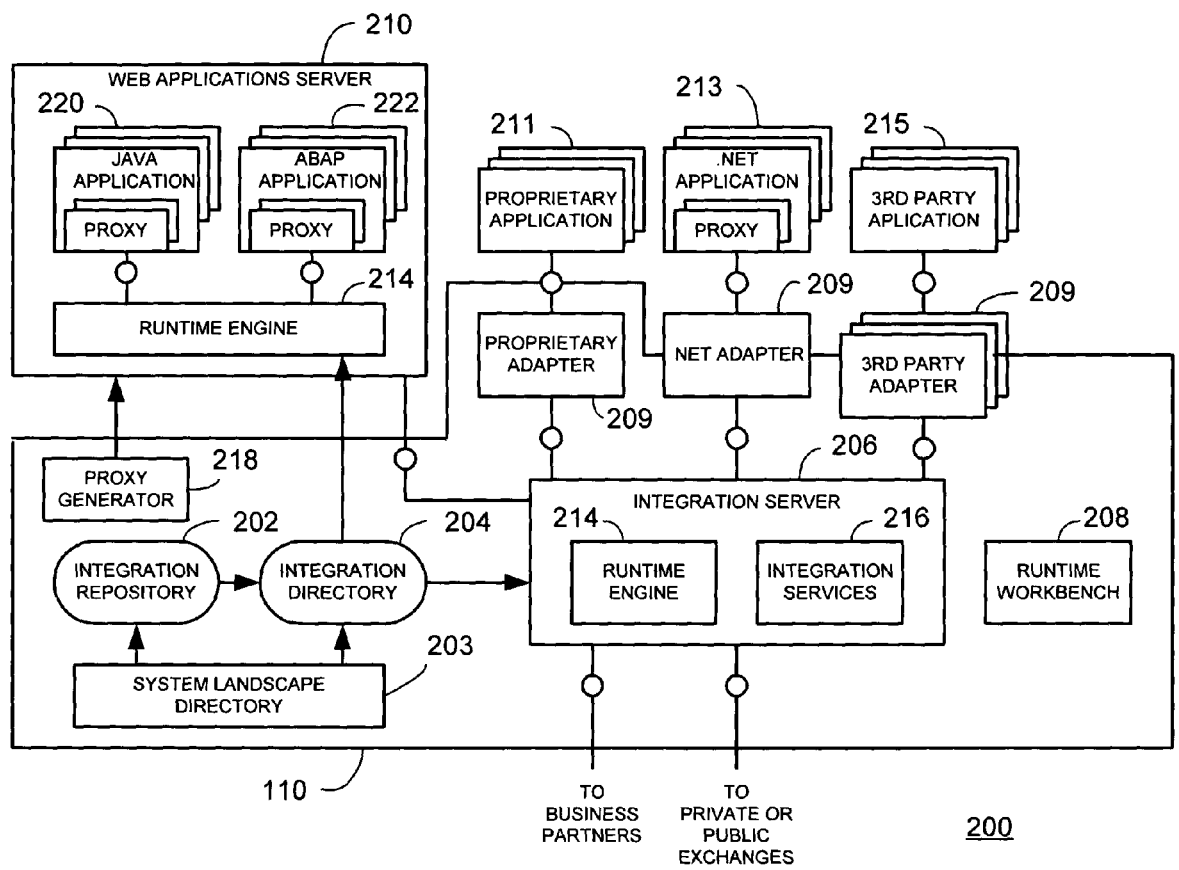
FIG. 2 is a block diagram of an exchange infrastructure.

FIG. 2 illustrates a system landscape 200 including an XI 110 for facilitating message-based collaboration among applications. The exchange infrastructure 110 includes an integration repository 202, an integration directory 204, a system landscape directory 203, and an integration server 206. The integration repository 202 captures design-time collaboration descriptions of all software components that can communicate via the XI 110. The integration directory 204 captures configuration-specific collaboration descriptions of the system landscape 200 at runtime, which includes accessing actual component installations from the system landscape directory 203 and connectivity descriptions for external components, all of which represents the shared business semantics of the system landscape 200. The integration server 206 uses the shared business semantics at runtime to execute message-based collaboration among the active software components.

The integration server 206 includes a runtime engine 214 that provides messaging and business process control at runtime for connecting services and managing the process flow of value chains. The integration server 206 also includes integration services 216 that typically require an application-specific implementation such as analytics and data management services, for example. Like the integration repository 202 and integration directory 204, the integration server 206 is configured for deployment within any existing system infrastructure. The integration server 206 is preferably a dedicated server that applies the shared collaboration knowledge of the integration directory 204 of the supported system landscape in a runtime collaboration environment. A runtime workbench 208 allows organizations or users to manage the reliable operation of the XI 110.

The XI 110 also includes various adapters 209 that provide connectivity between the integration server 206 and proprietary applications 211, Web-based services 213, and third party applications 215. The XI 110 can also include Web applications server 210 that provides Web-based applications programmed according to standard computing platforms using web-specific programming languages such as Java and ABAP, for instance. The Web application server 210 also includes an instance of the runtime engine 214 for providing messaging and business process control between Web-based applications such as Java applications 220 and ABAP applications 222, and other components.

Communication or calls to external software components can be enabled by using a proxy which allows the interface for the software component to be implemented locally in the XI 110. Proxies make the communication technology stack transparent to applications, and present an application with a programming language-dependent interface. The proxies can be generated by a proxy generator 218 based on information stored on the integration repository 202. The proxy generator 218 uses the interface information described via a standard Web-based language such as WSDL and XSDL to create platform- and programming language-dependent code in the application development system. The communication logic can be implemented within the proxy that represents the interface description of the respective development platform, such as Java, ABAP, and .NET for the web-based applications 213. The proxies convert platform-specific data types into XML and provide access to the component-specific local integration engine. On the outbound side, proxies are generated completely. Outbound proxies can be called via a service invocation provided by an application's developer. On the inbound side, only proxy skeletons need to be generated which must be further implemented by the receiving application.

Figure 3:
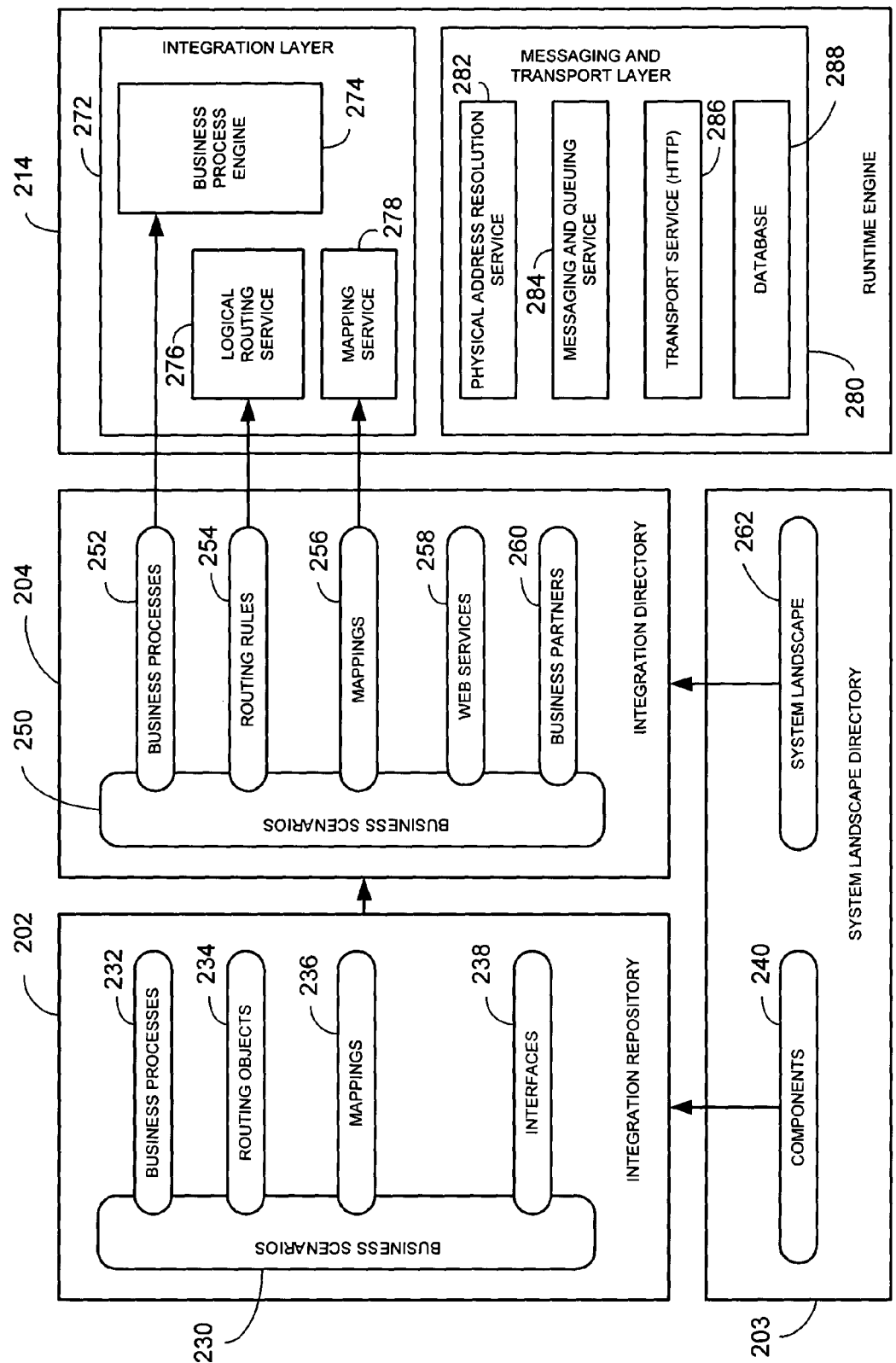
FIG. 3 is a detailed block diagram of an integration repository, integration directory, and runtime engine for collaborative processing.

FIG. 3 illustrates the integration repository 202, the system landscape directory 203, the integration directory 204 and an instantiation of the runtime engine 214 in greater detail. The integration repository 202 includes design-time business processes 232, routing objects 234, mappings 236, and interfaces 238, all of which are defined according to one or more business scenarios 230. The integration repository 202 accesses descriptions of all software components 240 in the system landscape from the system landscape directory 203. The business scenarios 230 of the integration repository 202 describe and configure message-based interaction between application components or enterprises. An enterprise can select one or more business scenarios described in the integration repository 202 as a best practice for rapid configuration of the XI 110.

The business processes 232 can be implemented as extensible compound Web services executed using a business process engine 274. Each business process 232 is modeled centrally in the integration repository 202, and can be defined to the detail of user interaction steps. A company or user designs each business process 232 according to its business needs, independently of the technical implementation. There may be several categories of business process templates: i.e. generic business processes, industry-specific processes, and company-specific processes, for example. Each process identifies the Web services that are needed and that must be interconnected. In one specific implementation, business processes 232 are defined using a graphical interface, and then stored in a standardized format like Business Process Modeling Language (BPML). The business process engine can then interpret these models and execute them to drive collaboration among software components.

Routing objects 234 are pointers that point to a specific part of a message. They are predefined criteria to determine potential receivers of messages that must be distributed between components and business partners during collaborative processing. Information about the routing objects is used for receiver determination. Mappings 236 define required transformations between message interfaces 238, message types, or data types in the integration repository 202. These transformations cover structural conversions and value mappings. Structural conversions are used for semantically equivalent types that are syntactically or structurally different, whereas value mapping may be used when an object is identified by different keys in multiple systems. In a specific implementation, a graphical mapping tool is provided to assist in mapping, and transforming data is based on the Extensible Stylesheet Language Transformation (XSLT) or Java code.

The integration repository 202 is the central point of entry for interface development, storage and retrieval, and includes interfaces 238 that describe all message interfaces of all software components in the system landscape. Accordingly, the interfaces 238 can be implemented on any software component using any technology. In one implementation, the interfaces 238 are based on WSDL. Message interfaces are made up of message types, which are in turn made up of data types. The data types can be described using XML Schema Definition Language (XSDL). An example of a data type is "address," which is used in the message type "Create PO" and can be reused for the message type "Create Invoice." Interfaces 238 can be arranged according to any classification, such as inbound and outbound, or synchronous and asynchronous.

The components 240 represent component descriptions that include information about application components, as well as information relating to their dependencies on each other. In a specific implementation, the component descriptions are based on the standard Common Information Model (CIM) of the Distributed Management Taskforce. Since the integration repository 202 includes design-time information, it uses only component-type information, independent of actual installation, that is stored as components 240 in the system landscape directory 203. The component descriptions can be added using an API or interactively using a graphical user interface.

The integration directory 204 details information from the integration repository 202 that is specific to the configuration of each component as installed in the system. The configuration-specific collaboration descriptions of the integration directory 204 can be generated automatically from content in the integration repository 202 or manually by a user using a graphical user interface. In one implementation, the integration directory 204 is built on a Java platform and its content is represented via XML using open Internet standards. The integration repository 202 can be upgraded without affecting the integration directory 204 or any runtime collaborative processes. The user then decides which changes should be transferred to the integration directory 204, either as predetermined automatic upgrades or manually via graphical tools.

The integration directory 204 includes configuration-specific descriptions of business scenarios 250, business processes 252, routing rules 254, and executable mappings 256. The integration directory 204 also includes descriptions of active Web services 258, and active business partners 260. The integration directory 204 uses a description of the active system landscape 262 from the system landscape directory 203. The business scenarios 250 in the integration directory 204 represent the overall view of the interaction among interfaces and mappings 256 in the context of the actual configuration relevant for the specific implementation. The business processes 252 represents an executable description of all active business processes.

The routing rules 254 determine the receivers of a message on a business level. In one specific implementation, the content of a message is used as a routing rule 254. Other parameters may also be used. Relevant input parameters include the sender, the sender message type, the message to identify the receivers, and the receiver message type. The routing rules 254 can be described declaratively using XML Path Language (Xpath, i.e. by using a graphical tool) or can be coded in Java or use routing objects 234. The integration engine 214 at runtime accesses information on the routing rules 254.

The routing rules 254 may use logical terms to describe senders and receivers in order to separate them from the physical address provided by the Web services 258 described in the integration directory 204. The physical address can therefore be changed without changing business-oriented content. Mappings 256 in the integration directory 204 represent mappings required in the active system landscape, in contrast to the integration repository mappings 236 that contains all supported mappings. Some new entries however, such as a new sequence of mappings, can be made only in the integration directory 204 to address additional Web services for mapping, for example. The integration engine 214 accesses the integration directory mappings 256 at runtime.

Web services 258 describe interfaces implemented within the current active system landscape, as well as active Web services supported by described business partners 260. As such, information describing Web services 258 can be exchanged with UDDI-compatible directories or added manually. Each Web service 258 description also provides physical addressing details, access information, and other special attributes such as uniform resource locator (URL), protocol, and security information. In one implementation, the Web services 258 are described in WSDL, and SOAP and ebXML are used as messaging protocols. The integration engine 214 accesses information about the Web services 258 at runtime as well.

The system landscape 262 of the system landscape directory 203 describes the current system landscape that uses the XI 110. The system landscape 262 describes which components are installed and available on certain machines within the system, which instance or client was chosen, further information on the installed components, other system landscapes, and so on. The system landscape 262 description is based on an open architecture and can adhere to any widely accepted standard such as CIM. Thus, many proprietary and third party components can be configured to automatically register themselves in the system landscape 262 upon being installed within the actual system landscape. Access interfaces to the system landscape 262 description can be based on open standards as well, such as the Web-based Enterprise Management (WBEM) and SOAP standards.

Business partners 260 defines information for business partners of an enterprise, such as names, addresses, and URLs, but may also contain more detailed and sophisticated information. For instance, the business partners 260 may include a description of the message formats that can be directly received and processed, or of security protocols used for safe communications, or trading terms that are employed in the partnership. The kind of information stored in business partners 260 can be governed by enterprise-specific decisions of the enterprise using the XI 110.

The integration directory 204 and the runtime engine 214 form a collaborative runtime environment for executing collaborative business processes. The collaborative runtime environment provides all runtime components relevant for exchanging messages among the connected software components and business partners. The integration server 206 executes within the collaborative runtime environment or within Web application server 210, either of which can include an instance of the runtime engine 214.

The runtime engine 214, which exchanges all messages between the various interconnected components, includes two layers: an integration layer 272 and a messaging and transport layer (MTL) 280, or simply "message transport layer." The integration layer 272 includes a business process engine 274 executing centrally modeled business processes, a logical routing service 276 and a mapping service 278. The MTL 280 provides a physical address resolution service 282, a messaging and queuing service 284, a transport service 286 via HTTP, and a database 288. The integration services 216 in the integration server 206 can support the runtime engine 214. An MTL 280 is also included in each instantiation of the runtime engine 214 in Web applications servers 210, as well as in each adapter 209 of the adapter framework connecting to various software components. Each MTL 280 has a role in the execution of the EO protocol, as will be explained further below.

At runtime, business processes 252 are instantiated and executed by the business process engine 274, which executes the respective Web services described in Web services 258 independent of their location according to the business process model. The business process engine 274 is independent of the semantics of the executed business processes 252, and is configured as a mediator and facilitator for business processes 252 to interact with technical components of the runtime system landscape.

Figure 4:
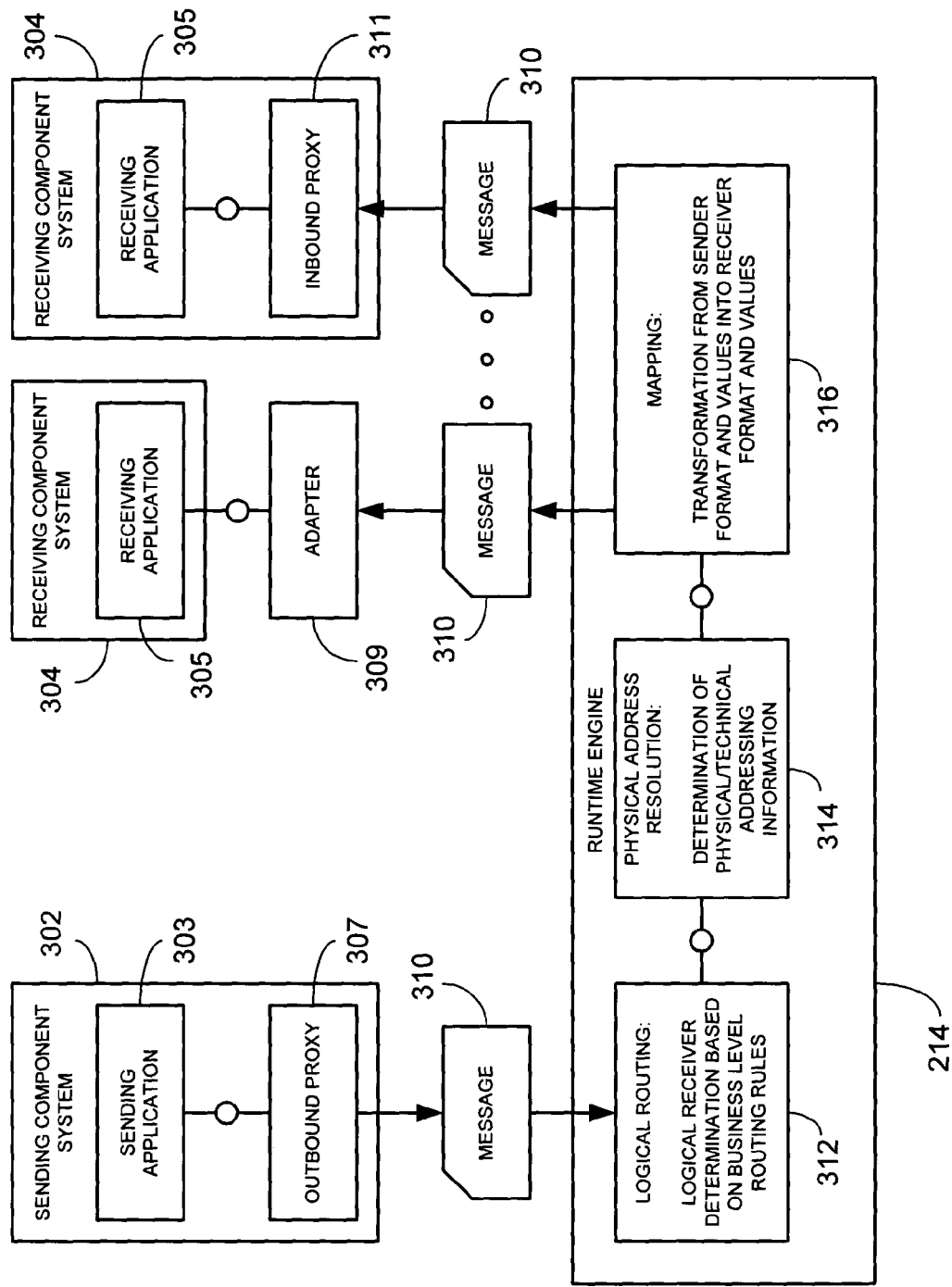
FIG. 4 is a block diagram of system for transmitting a message using a runtime engine of the exchange infrastructure.

FIG. 4 is a block diagram illustrating several functions of the runtime engine 214 in a process of exchanging a message between applications. A sending application 303 resides in a sending component system 302, which represents the hardware and software platform of the sending application 303. One or more receiving applications 305 each reside in a receiving component system 304. A communication path for a message 310 can include an outbound proxy 307 at the outbound interface from the sending component system 302, through the runtime engine 214 and adapter 309 to the receiving component system 304. A receiving component system 304 may also utilize an inbound proxy 311 rather than an adapter. The configuration and connectivity of the shown receiving component systems 304 is merely exemplary, and it should be noted that such configuration and connectivity could take any number of forms. The pictured example illustrates both asynchronous and synchronous communication. In synchronous communication, routing and physical address resolution is only needed for the request as the response is transferred to the sender directly over the same channel the request message has used.

With reference also to FIGS. 2 and 3, for a given message the logical routing service 276 uses information on the sending application and the message interface to determine receivers and required interfaces by evaluating the corresponding routing rules, as shown at 312. The routing rules are part of the configuration-specific descriptions of the runtime system landscape provided by the integration directory 204, and can be implemented as Xpath expressions or Java code. The mapping service 278 determines the required transformations that depend on message, sender, and sender interface, as well as on the receiver and receiver interface, at 316. In the case of asynchronous communication, even the message direction is determined to appropriately transform input, output, and fault messages.

After retrieving the required mapping from the integration directory 204, the mapping service 278 can either execute XSLT mappings or Java code (or any combination in a given sequence) to the content of the sent message. Below the integration layer, messaging and queuing services 284 move the message to the intended or required receiver(s). After the message is transformed into the format expected by each receiver, the physical address of the required receiver service and other relevant attributes are retrieved from the integration directory 204 by the physical address resolution service 282 and mapped to the message, at 314.

A queuing engine in the messaging and queuing service 284 stores ingoing, outgoing, erroneous, and work-in-progress messages persistently. The messaging and transport layer 280 of the runtime engine 214 provides queuing functions for the physical decoupling of application components and guarantees messages are delivered exactly once (EO) according to a protocol (i.e. the "EO protocol"). The transport service 286 enables the runtime engine 214 to act as both an HTTP client and server. The transport service 286 implements an HTTP client that enables outbound communication and an HTTP server that handles inbound communication by accepting incoming documents. Additional server functions can address situations in which the receiver has no HTTP server by supporting polling over HTTP.

Messaging services of the runtime engine 214 and business processing services of the business process engine 274 may be provided in separate layers. For instance, in the MTL 280, the system may transport messages that include a payload in an "envelope" of header and routing information. The system may look into the envelope, analyze where the message is from and send the message to the intended recipient. The messaging system may include a persistence mechanism, e.g., a database 288, in which messages are stored at least temporarily. In a business processing layer, i.e. the services of the business process engine 274 within the integration layer 272 (a higher-level service of the integration server 206 than the messaging services), data may be passed between business applications during execution of a business process 252 via API calls. The business process engine 274 may also utilize some type of persistence mechanism (i.e. storage), however, it may only need to store a status of a business process 252 being executed and not the message data itself.

Figure 5:
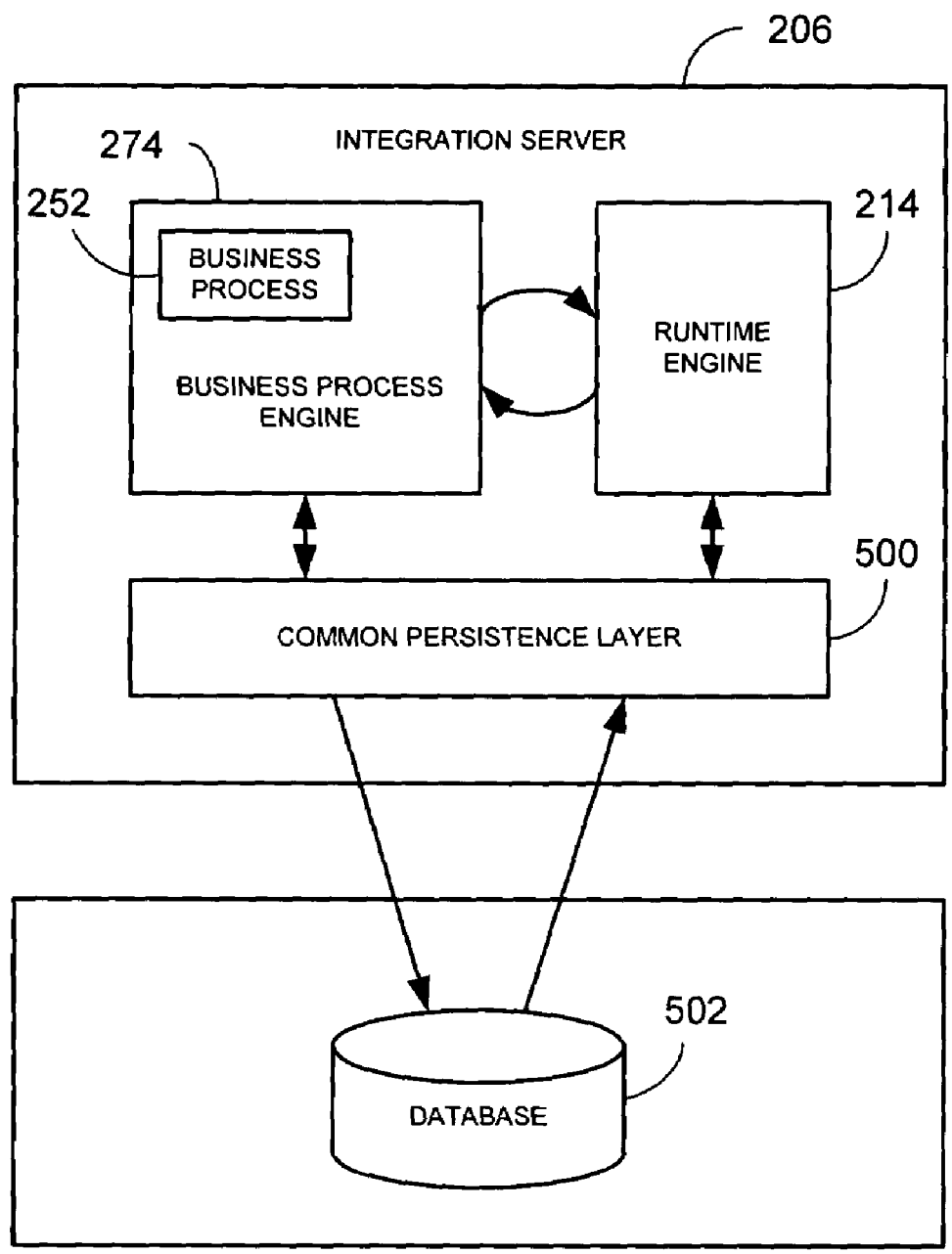
FIG. 5 is a block diagram illustrating a common persistence layer used by the runtime engine and the business process engine of the exchange infrastructure.

In an embodiment, the integration layer 272 of the business process engine 274 and the MTL 280 of the runtime engine 214 share a common persistence layer 500, as shown in FIG. 5. The integration server 206 supplies the basic services of transport, mapping, routing and technical address resolution by the runtime engine 214. The business process engine 274 extends this set of services for communications through the XI between applications that require business process logic.

Sending and receiving applications may use the XI as an intermediate layer when communicating with the business process engine 274. The business process engine 274 is governed by control data that is stored in a database 502 or other storage in addition to XI data. However, both the business process engine 274 and the XI middleware operate on substantially the same message formats, and therefore may utilize the same persistence mechanism, although they may use different namespaces. Accordingly, an integrated monitoring process may be established on the common persistence layer 500 to monitor the execution of business processes and application integration processes.

The runtime engine 214 can be configured to define a set of conditional actions to simplify analysis of error situations. When the runtime engine 214 starts processing a message, it can check which conditions (e.g. user name, message id) are provided, and perform corresponding actions. Possible actions on the message include, but are not limited to: setting trace level, switching on logging, activating debugging points, or downloading the message to a file at specific processing steps. All of these operations can result in setting attributes in the message header, known as "keeping state," and therefore may affect follow-on actions of the runtime engine 214.

The messaging pipeline of the XI, including outbound and inbound proxies 307 and 311, message adapters 309, and the runtime engine 214, can be configured for reconstructing all processing steps in detail. The trace information may be a part of the message itself, which alleviates the need for finding trace information of a corresponding message within a complex system landscape. A message may also include a special attachment having the trace information in a markup language format, such as XML. Consequently, standard monitoring techniques of messages and all the operations of message life cycle like deletion, archiving, persistence can be applied by the runtime engine 214 to messages as well as to the trace information.

The message id can be the only key field stored in the persistence layer 500. However, if the sending and receiving component systems are identical, a message can be rejected because of a "duplicate key" error. Accordingly, the common persistence layer 500 uses corresponding SENDER and RECEIVER pipelines as part of the message key or pointer in order to differentiate between sending and receiving applications and avoid the "duplicate key" error scenario.

Queues can be used for parallel inbound and outbound message processing. The degree of parallelism can be configured by designating a certain number of queues in the persistence layer 500 for inbound and outbound processing, respectively. Messages to the same receiver can be put into the same inbound processing queue. Whenever the first message of this queue cannot be sent to the receiving application because of a technical error (i.e. communication to the receiving application broke down, or the receiving application is not available, etc.) the queue is stopped and all other messages to the receiver are implicitly stopped. This avoids unnecessary message flow, and optimizes throughput of the XI.

Figure 6:
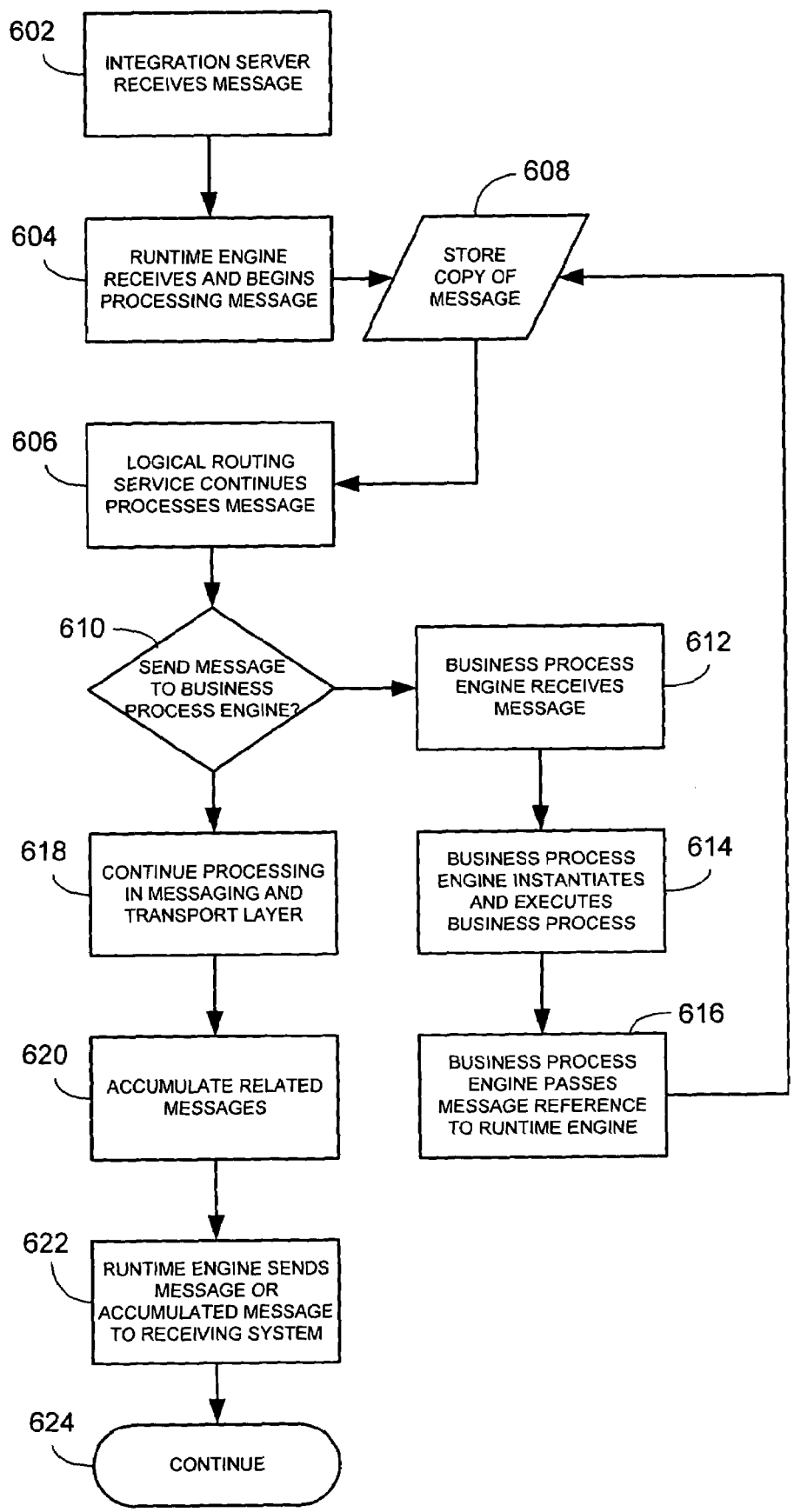
FIG. 6 is a flowchart illustrating a method employing a common persistence layer according to an embodiment of the exchange infrastructure.

FIG. 6 is a flowchart that further illustrates the operation of the common persistence layer 500. With reference also to FIGS. 3-5, a method includes the integration server 206 receiving a message at block 602. The runtime engine 214 receives the message and begins to process the message in its messaging and transport layer at block 604. During processing, a copy of the message may be stored in the database 288 at block 608. The runtime engine 214 performs physical address resolution services on the message, and executes logical routing of the message at block 606. The logical routing service 274 will determine one or more receivers based on business level routing rules 254 from the integration directory 204.

The runtime engine 214, via the logical routing service 276 for example, determines at block 610 whether the message should be sent the business process engine 274. If so, at block 612 the business process engine 274 receives the message, determines which business process(es) 252 to execute, and instantiates the selected business process(es) 252 at block 614. Once the correct business process instance or instances are executed, the business process engine 274 passes a message reference, via the common persistence layer 500 to the runtime engine 214 for the appropriate message. Thus, utilizing the common persistence layer 500, the runtime engine 214 can access a copy of the message as stored at block 608, and continue processing the message at block 606 and at block 618 if the message is no longer determined to be passed, again or in the first instance, to the business process engine 274.

At block 620, related messages may be accumulated by grouping message references in the common persistence layer 500. For instance, a number of messages may be relevant to a particular purchase order to be processed by a receiving application. As each of the messages are processed by the runtime engine, the common persistence layer 500 can group message references together for batch processing by the business process engine 274 and/or batch transmission to the receiving application. Accordingly, business logic that is to be performed on related messages can be economized on groups of messages at a single business process instance. At block 622, a single message or a message group is sent by the runtime engine 214 to the receiving application in the receiving system.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Portions of this disclosure discuss operation though a portal, but any of a number of access systems and methods may be used to manage collaboration sessions. The logic flows depicted in FIG. 6 do not require the particular order shown, or sequential order, to achieve desirable results. Other embodiments may be within the scope of the following claims.

The invention claimed is:

1. An integrated message exchange system for collaborative business applications, comprising:
   an integration repository comprising a plurality of design-time business scenarios, each of the plurality of design-time business scenarios describing and configuring message-based interaction between application components or enterprises based on business process logic, routing rules, and executable mappings defined by the design-time business scenario, a system landscape directory that provides a description of an active system landscape and identifies a configuration-specific business scenario that is consistent with the active system landscape, the active system landscape comprising one or more installed applications with which the integrated message system communicates;

an integration directory that captures the configuration-specific business scenario, the configuration-specific business scenario being identified by the system landscape directory from the plurality of design-time business scenarios in the integration repository; and a processor that implements an integration server, the integration server comprising:

a message transport layer that transports a message from at least one sending application of the one or more installed applications to one or more receiving applications of the one or more installed applications, a runtime engine comprising a business process engine that executes the business process logic defined in the configuration-specific business scenario on the message if the at least one sending application and/or the one or more receiving applications require the business process logic, the runtime engine further comprising a logical routing service that evaluates the routing rules defined in the configuration-specific business scenario to determine one or more required interfaces for the one or more receiving applications and also to determine whether the business logic defined in the configuration-specific business scenario needs to be applied to the message, and a mapping service that applies the executable mappings defined in the configuration-specific business scenario to determine one or more required transformations to the message that depend on the message content, the at least one sending application, and/or the one or more receiving applications, and a persistence layer that is accessible from both the message transport layer and the runtime engine, and that stores a reference to each message processed by the message transport layer.

2. The system in accordance with claim 1, further comprising a database, accessible via the persistence layer, for storing a copy of each of the messages corresponding to the message references stored in the persistence layer.

3. The system in accordance with claim 1, wherein the message transport layer includes a physical address resolution service, and a transport service.

4. The system in accordance with claim 1 wherein the plurality of design-time business scenarios are accessed by the business process engine based on content of each selected message.

5. The system in accordance with claim 1, wherein the integration server comprises:
one or more integration services that are specific to one or more of the one or more installed applications.

6. The system in accordance with claim 1, wherein the integration server is a dedicated server that applies collaboration knowledge from the integration directory in a runtime collaboration environment.

7. A system as in claim 1, wherein the routing rules determine the one or more receiving applications on a business level.

8. In a collaborative business application landscape, a method for integrated message exchange, comprising:

capturing configuration-specific collaboration descriptions of one or more applications installed in an exchange infrastructure, the capturing comprising accessing a description of an active system landscape and a configuration-specific business scenario that is consistent with the active system landscape from a system landscape directory, the capturing further comprising referencing an integration repository that comprises a plurality of design-time business scenarios, each of the design-time business scenarios describing and configuring message-based interaction between two or more application components or enterprises based on business process logic, routing rules, and executable mappings defined by the design-time business scenario, the configuration-specific business scenario being selected from the design-time business scenarios;

receiving a message from a sending application of the one or more applications;

storing a copy of the message in a database;

storing a reference to the message in a persistence layer;

executing the business process logic defined in the configuration-specific business scenario on the message if the sending application and/or the one or more receiving applications of the one or more applications require the business process logic defined in the configuration-specific business scenario;

evaluating routing rules defined in the configuration-specific business scenario to determine one or more required interfaces for the one or more receiving applications and also to determine whether the business logic defined in the configuration-specific business scenario needs to be applied to the message;

applying the executable mappings defined in the configuration-specific business scenario to determine one or more required transformations to the message that depend on the message content, the sending application, and/or the one or more receiving applications; and based on the message reference stored in the persistence layer, transporting the message to the one or more receiving applications.

9. The method in accordance with claim 8, wherein transporting the message includes resolving a physical address of the one or more receiving applications.

10. The method in accordance with claim 8, further comprising accumulating, in the persistence layer, two or more message references of related messages.

11. The method in accordance with claim 10, wherein transporting the message includes: accessing and grouping the messages associated with the accumulated message references; and transporting the grouped messages to the one or more receiving applications.

12. The method in accordance with claim 8, wherein transporting the message to the one or more receiving applications comprises sending the message reference to a message transport layer for transporting the message to the one or more receiving applications.

13. An article comprising a machine-readable medium embodying instructions that when performed by one or more machines result in operations comprising:

capturing configuration-specific collaboration descriptions of one or more applications installed in an exchange infrastructure, the capturing comprising accessing a description of an active system landscape and a configuration-specific business scenario that is consistent with the active system landscape from a system landscape directory, the capturing further comprising referencing an integration repository that comprises a plurality of design-time business scenarios, each of the design-time business scenarios describing and configuring message-based interaction between two or more application components or enterprises based on business process logic, routing rules, and executable mappings defined by the design-time business scenario, the configuration-specific business scenario being selected from the plurality of design-time business scenarios;

receiving a message from a sending application of the one or more applications;

storing a copy of the message in a database;

storing a reference to the message in a persistence layer;

executing the business process logic defined in the configuration-specific business scenario on the message if the sending application and/or one or more receiving applications of the one or more applications require the business process logic defined in the configuration-specific business scenario;

evaluating routing rules defined in the configuration-specific business scenario to determine one or more required interfaces for the one or more receiving applications and also to determine whether the business logic defined in the configuration-specific business scenario needs to be applied to the message;

applying the executable mappings defined in the configuration-specific business scenario to determine one or more required transformations to the message that depend on the message content, the sending application, and/or the one or more receiving applications; and based on the message reference stored in the persistence layer, transporting the message to the one or more receiving applications.

* * * * *